(12) United States Patent
Washida et al.

(10) Patent No.: US 10,141,570 B2
(45) Date of Patent: Nov. 27, 2018

(54) POSITIVE ELECTRODE ACTIVE MATERIAL FOR LITHIUM SECONDARY CELL

(71) Applicant: Mitsui Mining & Smelting Co., Ltd., Tokyo (JP)

(72) Inventors: Daisuke Washida, Takehara (JP); Toshikazu Matsuyama, Takehara (JP); Tetsuya Mitsumoto, Takehara (JP); Daisuke Inoue, Takehara (JP); Hideaki Matsushima, Takehara (JP); Yoshimi Hata, Takehara (JP); Hitohiko Ide, Takehara (JP); Shinya Kagei, Takehara (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 15/113,063

(22) PCT Filed: Sep. 3, 2015

(86) PCT No.: PCT/JP2015/075069
§ 371 (c)(1),
(2) Date: Jul. 21, 2016

(87) PCT Pub. No.: WO2016/035853
PCT Pub. Date: Mar. 10, 2016

(65) Prior Publication Data
US 2017/0012286 A1    Jan. 12, 2017

(30) Foreign Application Priority Data

Sep. 3, 2014    (JP) .................................. 2014-179541

(51) Int. Cl.
*H01B 1/08*    (2006.01)
*H01M 4/525*    (2010.01)
(Continued)

(52) U.S. Cl.
CPC ........ *H01M 4/505* (2013.01); *C01G 45/1228* (2013.01); *C01G 51/50* (2013.01);
(Continued)

(58) Field of Classification Search
CPC .. H01B 1/00; H01B 1/08; H01M 4/58; H01M 4/525; C01G 45/02; C01G 49/02; C01G 51/04
See application file for complete search history.

(56) References Cited

U.S. PATENT DOCUMENTS

2005/0014065 A1    1/2005    Jung et al.
2005/0250013 A1    11/2005    Tatsumi et al.
(Continued)

FOREIGN PATENT DOCUMENTS

JP    2001291518 A    10/2001
JP     200544801 A    2/2005
(Continued)

OTHER PUBLICATIONS

Saavedra-Arias et al "A combined first-principles computational/experimental study on LiNi0.66Co0.17Mn0.17O2 as a potential layered cathode . . . ", Journal of Power Sources 211 (2012) 12-18. (Year: 2012).*

*Primary Examiner* — Mark Kopec
(74) *Attorney, Agent, or Firm* — The Webb Law Firm

(57) ABSTRACT

The present invention relates to a positive electrode active material including a lithium metal composite oxide having a layer crystal structure, and provides a novel positive electrode active material for a lithium secondary cell, which can suppress the reaction with an electrolyte solution and can raise the charge-discharge cycle ability of the cell, and can make good the output characteristics of the cell. There is proposed a positive electrode active material for a lithium secondary cell, including an active particle having a surface (Continued)

portion where one or a combination of two or more (these are referred to as "surface element A") of the group consisting of Al, Ti and Zr is present, on a surface of a particle including a lithium metal composite oxide having a layer crystal structure and represented by the general formula: Li1+xM1−xO2 (wherein M is one or a combination of two or more (these are referred to as "constituent element M") of the group consisting of Mn, Co, Ni, transition elements of from the third group elements to the 11th group elements of the periodic table, and typical elements up to the third period of the periodic table), wherein the ratio (CA/CM) of a concentration CA of the surface element A to a concentration CM of the constituent element M is higher than 0 and lower than 0.8, as measured by XPS; the amount of surface lithium impurity is smaller than 0.40% by weight; and in an X-ray diffraction pattern measured by XRD, the ratio (003)/(104) of an integral intensity of the peak originated from the (003) plane to an integral intensity of the peak originated from the (104) plane is higher than 1.15.

17 Claims, 1 Drawing Sheet

(51) Int. Cl.
| | | |
|---|---|---|
| *H01M 4/505* | (2010.01) | |
| *C01G 53/00* | (2006.01) | |
| *H01M 4/04* | (2006.01) | |
| *C01G 45/12* | (2006.01) | |
| *C01G 51/00* | (2006.01) | |
| *H01M 10/0525* | (2010.01) | |
| *H01M 4/02* | (2006.01) | |

(52) U.S. Cl.
CPC ............ *C01G 53/50* (2013.01); *H01B 1/08* (2013.01); *H01M 4/0471* (2013.01); *H01M 4/525* (2013.01); *C01P 2002/70* (2013.01); *C01P 2002/74* (2013.01); *C01P 2002/85* (2013.01); *C01P 2004/64* (2013.01); *C01P 2004/84* (2013.01); *C01P 2006/12* (2013.01); *C01P 2006/40* (2013.01); *C01P 2006/82* (2013.01); *H01M 10/0525* (2013.01); *H01M 2004/028* (2013.01); *H01M 2220/20* (2013.01); *Y02E 60/122* (2013.01)

(56) References Cited

U.S. PATENT DOCUMENTS

| | | | |
|---|---|---|---|
| 2012/0273737 A1* | 11/2012 | Ooishi | H01M 4/525 |
| | | | 252/520.21 |
| 2013/0011726 A1 | 1/2013 | Takano et al. | |
| 2013/0130113 A1 | 5/2013 | Takano et al. | |
| 2013/0236780 A1* | 9/2013 | Yokote | H01M 4/485 |
| | | | 429/211 |
| 2014/0154581 A1 | 6/2014 | Kawasato et al. | |
| 2014/0212758 A1 | 7/2014 | Kawasato et al. | |
| 2016/0006026 A1* | 1/2016 | Paulsen | C01G 51/42 |
| | | | 429/231.3 |
| 2017/0288215 A1* | 10/2017 | Mitsumoto | H01M 4/366 |

FOREIGN PATENT DOCUMENTS

| | | |
|---|---|---|
| JP | 2005310744 A | 11/2005 |
| JP | 2005322616 A | 11/2005 |
| JP | 2005346956 A | 12/2005 |
| JP | 2008153017 A | 7/2008 |
| JP | 201238724 A | 2/2012 |
| JP | 2012023015 A | 2/2012 |
| JP | 201449309 A | 3/2014 |
| WO | 2004030126 A1 | 4/2004 |
| WO | 2007142275 A1 | 12/2007 |
| WO | 2013021955 A1 | 2/2013 |
| WO | 2013047877 A1 | 4/2013 |

* cited by examiner

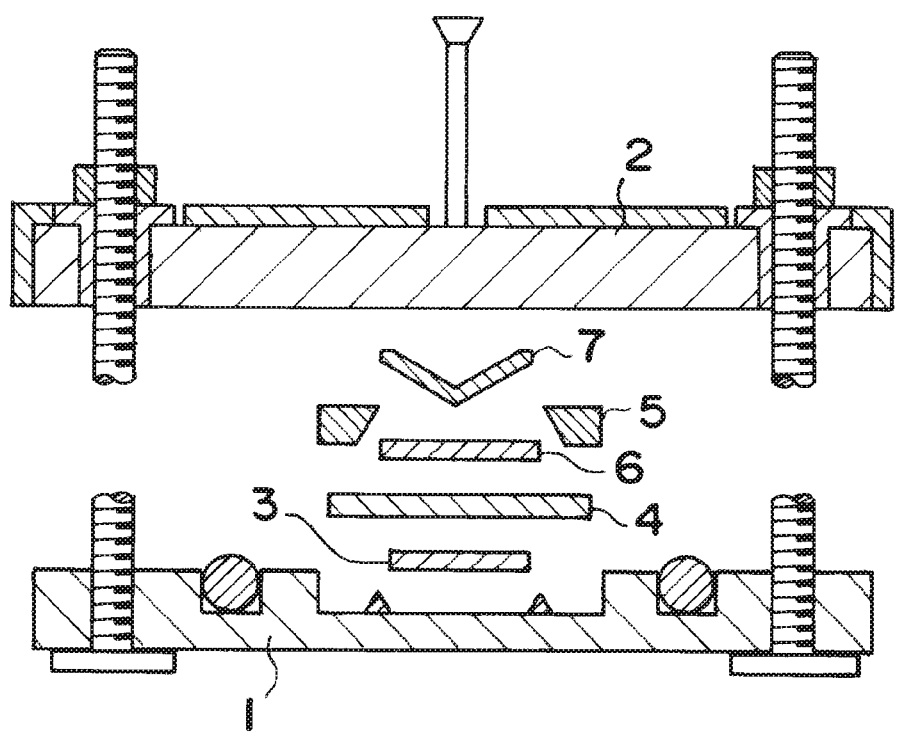

POSITIVE ELECTRODE ACTIVE MATERIAL FOR LITHIUM SECONDARY CELL

CROSS-REFERENCE TO RELATED APPLICATIONS

This application is the United States national phase of International Application No. PCT/JP2015/075069 filed Sep. 3, 2015, and claims priority to Japanese Patent Application No. 2014-179541 filed Sep. 3, 2014, the disclosures of which are hereby incorporated in their entirety by reference.

TECHNICAL FIELD

The present invention relates to a positive electrode active material for a lithium secondary cell, which can be used as a positive electrode active material of a lithium secondary cell.

BACKGROUND ART

Lithium cells, particularly lithium secondary cells, since they have characteristics of high energy density, long life and the like, are used as power supplies for household appliances such as video cameras, and portable electronic devices such as laptop computers and cellular phones. Recently, the lithium secondary cells have been applied also to large-size cells mounted on electric vehicles (EVs), hybrid electric vehicles (HEVs) and the like.

Lithium secondary cells are secondary cells having a following structure. In which in the charge time, lithium dissolves out as ions from a positive electrode and migrates to a negative electrode and is intercalated therein; On the other hand in the discharge time, lithium ions reversely return from the negative electrode to the positive electrode, and their high energy density is known to be due to potentials of their positive electrode materials.

As positive electrode active materials of lithium secondary cells, there are known, in addition to lithium manganese oxide ($LiMn_2O_4$) having a spinel structure, lithium metal composite oxides having a layer crystal structure, such as $LiCoO_2$, $LiNiO_2$ and $LiMnO_2$. Since for example, $LiCoO_2$ has a layer crystal structure in which a lithium atom layer and a cobalt atom layer are alternately stacked through an oxygen atom layer, and is large in charge and discharge capacity and excellent in diffusability of lithium ion intercalation and deintercalation, many of lithium secondary cells commercially available at present employ lithium metal composite oxides having a layer crystal structure, such as $LiCoO_2$ as positive electrode active materials.

Lithium metal composite oxides having a layer crystal structure, such as $LiCoO_2$ and $LiNiO_2$, are represented by the general formula: $LiMO_2$ (M: transition metal). The crystal structure of these lithium metal composite oxides having a layer crystal structure is assigned to a space group R-3m ("-" is usually attached on the upper part of "3," indicating rotatory inversion. The same applies hereinafter); and their Li ions, Me ions and oxide ions occupy the 3a site, the 3b site and the 6c site, respectively. Then, these lithium metal composite oxides are known to assume a layer crystal structure in which a layer (Li layer) composed of Li ions and a layer (Me layer) composed of Me ions are alternately stacked through an O layer composed of oxide ions.

The case where such a lithium metal composite oxide having a layer crystal structure is used as a positive electrode active material of a lithium secondary cell poses such a problem that since especially when the cell is charged and discharged at a high temperature, the lithium metal composite oxide chemically reacts with an electrolyte solution and changes occur including adhesion of a reaction product of the reaction on a surface of the positive electrode active material, the capacity and the charge-discharge cycle ability of the cell decrease.

As one example of means of solving such a problem, it is considered that the particle surface of a lithium metal composite oxide having a layer crystal structure is coated with a metal or a metal oxide.

For example, Japanese Patent Laid-Open No. 2001-291518 discloses a positive electrode active material for a lithium secondary cell in which the surface of a lithium metal composite oxide having a layer crystal structure contains an oxide or composite metal oxide layer of a metal(s) selected from the group consisting of Mg, Al, Co, K, Na, Ca, Si, Ti and V.

Japanese Patent Laid-Open No. 2005-310744 discloses a positive electrode active material obtained by coating with aluminum the surface of a particle obtained by dispersing and stirring a particle powder of a lithium metal composite oxide having a layer crystal structure in an isopropyl alcohol solution and thereafter subjecting the dispersion to a heat treatment at 600° C.

Japanese Patent Laid-Open No. 2005-322616 discloses a lithium-containing oxide in which the surface of an oxide is coated with a layer including aluminum hydroxide, aluminum oxide and lithium carbonate, the oxide being obtained by adding a lithium metal composite oxide having a layer crystal structure and a powdery metallic aluminum to water to make a slurry, further stirring the slurry to dissolve the metallic aluminum, and thereafter drying the slurry at 80° C.

Japanese Patent Laid-Open. No. 2005-346956 discloses a lithium-containing oxide in which its particle surface is modified with an aluminum compound, wherein the lithium-containing oxide is obtained by adding aluminum stearate to a lithium metal composite oxide having a layer crystal structure, mixing and crushing the mixture by a ball mill, and subjecting the resultant to a heat treatment at 600° C.

WO2007/142275 discloses a positive electrode active material for a nonaqueous electrolyte secondary cell, as the positive electrode active material in which a lithium metal composite oxide particle having a layer crystal structure is surface-modified so that aluminum in a specific, relatively high concentration is incorporated into its specific surface region, wherein the positive electrode active material is composed of a surface-modified lithium-containing oxide particle in which aluminum is incorporated into the surface layer of the lithium metal composite oxide particle having a layer crystal structure, and the aluminum content within 5 nm of the surface layer is 0.8 or higher in atomic ratio with respect to the total of Ni and elements M.

Japanese Patent Laid-Open No. 2008-153017 discloses, from the viewpoint of use for a positive electrode active material in which the surface of a lithium oxide having a specific composition and having a specific particle diameter and particle size distribution is coated, the positive electrode active material for a nonaqueous electrolyte secondary cell, which is a lithium metal composite oxide having a layer crystal structure and has a structure in which the surface of a lithium oxide for a nonaqueous electrolyte secondary cell composed of particles having a particle distribution of an average particle diameter D50 of 3 to 15 μm, a minimum particle diameter of 0.5 μm or larger, a maximum particle diameter of 50 μm or smaller, and a D10/D50 of 0.60 to 0.90 and a D10/D90 of 0.30 to 0.70 is coated with a substance A (A is a compound composed of at least one element selected from the group consisting of Ti, Sn, Mg, Zr, Al, Nb and Zn).

As described before, when the particle surface of the lithium metal composite oxide is coated with a metal or a metal oxide in order to suppress the reaction of the lithium metal composite oxide with an electrolyte solution, there resultantly arises such a new problem that the rate capability and the output characteristics of a cell worsen.

SUMMARY OF THE INVENTION

Then, the present invention relates to a positive electrode active material comprising a lithium metal composite oxide having a layer crystal structure, and is to provide a novel positive electrode active material for a lithium secondary cell, which, in the case of being used as a positive electrode active material of a lithium secondary cell, can suppress the reaction with an electrolyte solution and raise the charge-discharge cycle ability of the cell, and can make the rate capability and the output characteristics equal to or more than those of conventionally proposed surface-treated positive electrode active materials.

The present invention proposes a positive electrode active material for a lithium secondary cell, comprising a particle having a surface portion where one or a combination of two or more (these are referred to as "surface element A") of the group consisting of Al, Ti and Zr is present, on a surface of a particle comprising a lithium metal composite oxide having a layer crystal structure and represented by the general formula: $Li_{1+x}M_{1-x}O_2$ (wherein M is one or a combination of two or more (these are referred to as "constituent element M") of the group consisting of Mn, Co, Ni, transition elements of from the third group elements to the 11th group elements of the periodic table, and typical elements up to the third period of the periodic table), wherein the ratio ($C_A/C_M$) of a concentration (at %) (referred to as "$C_A$"; in the case where the surface element A contains two or more elements, the total concentration) of the surface element A to a concentration (at %) (referred to as "$C_M$"; in the case where the constituent element M contains two or more elements, the total concentration) of the constituent element M is higher than 0 and lower than 0.8, as measured by X-ray photoelectron spectroscopy (XPS); the amount of surface lithium impurity is smaller than 0.40% by weight; and in an X-ray diffraction pattern measured by a powder X-ray diffractometer (XRD) using CuKα1 radiation, the ratio (003)/(104) of an integral intensity of the peak originated from the (003) plane to an integral intensity of the peak originated from the (104) plane is higher than 1.15.

The positive electrode active material the present invention proposes, in the case of being used as a positive electrode active material of a lithium secondary cell, can suppress the reaction with an electrolyte solution and improve the charge-discharge cycle ability, and can make the output characteristics equal to or more than that of surface-treated conventional positive electrode active materials. Therefore, the positive electrode active material the present invention proposes is especially excellent as a positive electrode active material of especially vehicular cells, especially cells mounted on electric vehicles (EVs) and hybrid electric vehicles (HEVs).

BRIEF DESCRIPTION OF THE DRAWING

The drawing illustrates a constitution of a cell for electrochemical evaluation fabricated in the cell characteristics evaluation in Examples.

DESCRIPTION OF EMBODIMENTS

Hereinafter, embodiments of the present invention will be described. The present invention, however, is not limited to the following embodiments.
<Present Positive Electrode Active Material>

A positive electrode active material for a lithium secondary cell according to one example of embodiments of the present invention is a positive electrode active material (referred to as "present positive electrode active material") for a lithium secondary cell, comprising a particle (referred to as "present particle") having a surface portion where one or a combination of two or more (these are referred to as "surface element A") of the group consisting of Al, Ti and Zr is present, on a surface of a particle (referred to as "present lithium metal composite oxide particle") comprising a lithium metal composite oxide having a layer crystal structure and represented by the general formula (1): $Li_{1-x}M_{1-x}O_2$ (wherein M is one or a combination of two or more (these are referred to as "constituent element M") of the group consisting of Mn, Co, Ni, transition elements of from the third group elements to the 11th group elements of the periodic table, and typical elements up to the third period of the periodic table).

The present positive electrode active material may comprise, in addition to the present particle, other components. However, from the viewpoint of effectively providing characteristics of the present particle, the present particle accounts for preferably 80% by weight or more, more preferably 90% by weight or more, and still more preferably 95% by weight or more (including 100% by weight).
<Present Particle>

The present particle is a particle having the surface portion containing the surface element A on the surface of the present lithium metal composite oxide particle.

The present particle may have other layers and other portions as long as having the surface portion.
(The Present Lithium Metal Composite Oxide Particle)

The present lithium metal composite oxide particle is a particle comprising a lithium metal composite oxide having a layer crystal structure and represented by the general formula (1): $Li_{1-x}M_{1-x}O_2$ (wherein M is one or a combination of two or more (these are referred to as "constituent element M") of the group consisting of Mn, Co, Ni, transition elements of from the third group elements to the 11th group elements of the periodic table, and typical elements up to the third period of the periodic table).

In the general formula (1): $Li_{1+x}M_{1-x}O_2$, "1+x" is preferably 1.00 to 1.07, more preferably 1.01 or more and 1.07 or less, still more preferably 1.02 or more and 1.06 or less.

"M" in the above formula (1) suffices if being one or a combination of two or more of Mn, Co, Ni, transition elements of from the third group elements to the 11th group elements of the periodic table, and typical elements up to the third period of the periodic table.

Here, examples of the transition elements of from the third group elements to the 11th group elements of the periodic table, and the typical elements up to the third period of the periodic table include Al, V, Fe, Ti, Mg, Cr, Ga, In, Cu, Zn, Nb, Zr, Mo, W, Ta and Re. Therefore, "M" suffices if being one or a combination of two or more of, for example, Mn, Co, Ni, Al, V, Fe, Ti, Mg, Cr, Ga, In, Cu, Zn, Nb, Zr, Mo, W, Ta and Re.

In such a way, "M" may be constituted, for example, of only three elements of Mn, Co and Ni, may contain, in addition to the three elements, one or more of the above other elements, or may have another constitution.

In the case where "M" of the above formula (1) contains three elements of Mn, Co and Ni, the molar ratio of Mn, Co and Ni contained is preferably Mn:Co:Ni=0.10 to 0.45:0.03 to 0.40:0.30 to 0.75, and more preferably Mn:Co:Ni=0.10 to 0.40:0.03 to 0.40:0.30 to 0.75.

Here, in the above general formula (1), the atomic ratio of the amount of oxygen is stated as "2" for convenience, but is allowed to be more or less unfixed.

The present lithium metal composite oxide particle may contain unavoidable impurities. The present lithium metal composite oxide particle is allowed to contain the unavoidable impurities as long as elements thereof are each contained in 0.17% by weight or less, for example. This is because it is believed that the amount in such a degree scarcely affects characteristics of the present lithium metal composite oxide particle.

(The Surface Portion)

The surface portion is preferably such that one or a combination of two or more (these are referred to as "surface element A") of the group consisting of Al, Ti and Zr is present on the surface of the present lithium metal composite oxide particle.

The surface portion mentioned here is characterized in having portions where the concentration of the surface element A is higher than that in the particle inner portion are present on the particle surface.

The thickness of the surface portion is, from the viewpoint of suppressing the reaction with an electrolyte solution and improving the charge-discharge cycle ability, and maintaining or improving the output characteristics and the rate capability, preferably 0.1 nm to 100 nm, and more preferably 5 nm or larger and 80 nm or smaller, particularly 60 nm or smaller.

When the above surface portion is present on the surface of the present lithium metal composite oxide particle, and in the case where the present lithium metal composite oxide particle is used as a positive electrode active material of a lithium secondary cell, the reaction with an electrolyte solution is suppressed and the charge-discharge cycle ability is improved, and the rate capability and the output characteristics can be made equal to or more than those of conventionally proposed surface-treated positive electrode active materials. Therefore, the present lithium metal composite oxide is suitable for use as a positive electrode active material of a lithium secondary cell, and is especially excellent as a positive electrode active material of especially vehicular cells, especially cells mounted on electric vehicles (EVs) and hybrid electric vehicles (HEVs).

Whether or not the surface portion where the surface element A is present is present on the surface of the present lithium metal composite oxide particle can be judged by whether or not the concentration of the surface element A is higher in the particle surface than in the particle inner portion. Specifically, that can be judged, for example, by observing the particle by a scanning transmission electron microscope (STEM) and checking whether or not any peak of the surface element A is observed on the surface portion of the particle.

In the present lithium metal composite oxide particle, it is preferable that the ratio ($C_A/C_M$) of a concentration (at %) (referred to as "$C_A$"; in the case where the surface element A contains two or more elements, the total concentration) of the surface element A to a concentration (at %) (referred to as "$C_M$"; in the case where the constituent element M contains two or more elements, the total concentration) of the constituent element M is higher than 0 and lower than 0.8, as measured by X-ray photoelectron spectroscopy (XPS). Here, in the present lithium metal composite oxide particle, $C_M$>0.

When the surface element A is present such that the ratio ($C_A/C_M$) becomes lower than 0.8, the reaction with an electrolyte solution can be suppressed and the charge-discharge cycle ability can be improved. Further the low-temperature output characteristics can be made equal to or more than that of a conventionally proposed surface-treated lithium metal composite oxide powder.

From such a viewpoint, the ratio ($C_A/C_M$) is preferably higher than 0 and lower than 0.8, more preferably higher than 0 and 0.6 or lower, and still more preferably higher than 0 and 0.5 or lower, particularly 0.4 or lower.

Further the ratio ($C_A/C_{Ni}$) of a concentration (at %) (referred to as "$C_A$"; in the case where the surface element A contains two or more elements, the total concentration) of the surface element A to a concentration (at %) (referred to as "$C_{Ni}$") of a constituent element Ni is preferably higher than 0 and lower than 2.0, more preferably higher than 0 and 1.6 or lower, and still more preferably higher than 0 and 1.2 or lower, particularly 0.8 or lower, as measured by X-ray photoelectron spectroscopy (XPS). Here, in the present lithium metal composite oxide particle, $C_{Ni}$>0.

When the concentration of Ni is high, especially since the life deterioration at a high voltage becomes large, it is preferable to regulate the ratio ($C_A/C_{Ni}$) in the above manner.

Further the above $C_A$ is preferably higher than 0 at % and lower than 10 at %, more preferably higher than 0.01 at % and 6 at % or lower, still more preferably higher than 0.05 at % and 5 at % or lower, and further still more preferably higher than 0.1 at % and 4 at % or lower. The above $C_M$ is preferably higher than 0 at % and lower than 30 at %, more preferably higher than 1 at % and 25 at % or lower, still more preferably higher than 3 at % and 20 at % or lower, and further still more preferably higher than 5 at % and 16 at % or lower.

The above $C_{Ni}$ is preferably higher than 0 at % and lower than 25 at %, more preferably higher than 0.5 at % and 20 at % or lower, still more preferably higher than 1 at % and 15 at % or lower, and further still more preferably higher than 2 at % and 9 at % or lower.

Further it is preferable that the concentration (at %) (referred to as "$C_M$"; in the case where the constituent element M contains two or more elements, the total concentration) of the constituent element M is higher than 0 at % and lower than 30 at %; the concentration (at %) (referred to as "$C_A$"; in the case where the surface element A contains two or more elements, the total concentration) of the surface element A is higher than 0 at % and lower than 10 at %; and the concentration (at %) (referred to as "$C_{Ni}$") of the constituent element Ni is higher than 0 at % and lower than 25 at %.

When each concentration is regulated in the above range, the reaction with an electrolyte solution can be suppressed and the charge-discharge cycle ability can be improved, and the output characteristics and the rate capability can be made equal to or more than that of a conventionally proposed surface-treated positive electrode active material.

In such a manner, in order to regulate each of $C_A/C_M$, $C_A/C_{Ni}$, $C_M$, $C_{Ni}$ and $C_A$ in the above range, the regulation may be made, for example, by regulation of the amount of the surface element A in a surface treating agent, and regulation thereafter of the heat treatment temperature and heat treatment time, when the present lithium metal composite oxide particle is subjected to a surface treatment. However, the regulation is not limited to this method.

<Crystal Structure>

With respect to the crystal structure of the present lithium metal composite oxide particle, in an X-ray diffraction pattern measured by XRD using CuKα1 radiation, it is preferable that the ratio (003)/(104) of an integral intensity of the peak originated from the (003) plane to an integral intensity of the peak originated from the (104) plane is higher than 1.15.

When the ratio (003)/(104) is more nearly 1.00, it means that the proportion a rock salt structure accounts for is higher. It was found that when the ratio (003)/(104) was higher than 1.15, the proportion a rock salt structure accounts for became low and the rate capability and the output characteristics could be made good.

From such a viewpoint, in the present positive electrode active material, the ratio (003)/(104) is preferably higher than 1.15, and more preferably 1.20 or higher.

Here, in the present positive electrode active material, in order to make the ratio (003)/(104) higher than 1.15, the regulation can be made, for example, by regulation of the calcination conditions, and regulation of the amount of a solvent or water in the surface treatment. However, the regulation is not limited to these methods.

<Amount of Surface Lithium Impurity>

In the present positive electrode active material, the amount of the surface lithium impurity is preferably 0.40% by weight or smaller.

When the amount of the surface lithium impurity is 0.40% by weight or smaller, it is preferable because there can be suppressed a reaction bringing on the deterioration of the charge-discharge cycle ability due to the reaction of remaining lithium as an unreacted content with an electrolyte solution.

From such a viewpoint, the amount of the surface lithium impurity is preferably 0.40% by weight or smaller, and more preferably larger than 0% by weight and 0.30% by weight or smaller.

Here, the surface lithium impurity is considered to be originated from Li not having reacted and remaining in the calcination. Therefore, in order to regulate the amount of the surface lithium impurity in the above range, the regulation can be made by regulation of the raw material mixing conditions and the calcination conditions for the sufficient reaction, and regulation of the surface treatment conditions and the heat treatment conditions for a further reaction of the unreacted content. However, the regulation is not limited to these processes.

<Specific Surface Area>

In the present positive electrode active material, the specific surface area (SSA) is preferably 0.2 to 3 $m^2/g$.

When the specific surface area (SSA) of the present positive electrode active material is 0.2 to 3 $m^2/g$, it is preferable because since the reaction field where Li intercalates and deintercalates can be sufficiently secured, the output characteristics and the rate capability can be maintained.

From such a viewpoint, the specific surface area (SSA) of the present positive electrode active material is preferably 0.2 to 3 $m^2/g$, particularly 2 $m^2/g$, more particularly 1.0 $m^2/g$ or smaller, and still more particularly 0.8 $m^2/g$ or smaller.

In order to make the specific surface area of the present lithium metal composite oxide powder fall within the above range, it is preferable that the calcination conditions and the crushing conditions are regulated. However, the regulation is not limited to these regulation methods.

<Amount of the Surface LiOH>

In the present positive electrode active material, the amount of LiOH measured by the following measuring method is, from the viewpoint of the improvement of the rate capability and the output characteristics, preferably smaller than 0.15% by weight, and more preferably smaller than 0.12% by weight.

In the present positive electrode active material, in order to make the amount of the surface LiOH smaller than 0.15% by weight, it is preferable that the surface treatment conditions and the heat treatment conditions are regulated to cause the unreacted content to react sufficiently. However, the regulation is not limited to these regulation methods.

<Amount of the Surface $Li_2CO_3$>

In the present positive electrode active material, the amount of $Li_2CO_3$ measured by the following measuring method is, from the viewpoint of the improvement of the rate capability and the output characteristics, preferably smaller than 0.30% by weight, more preferably smaller than 0.25% by weight, and especially preferably smaller than 0.20% by weight.

(Measuring Methods of the Amount of the Surface LiOH and the Amount of the Surface $Li_2CO_3$)

Titration is carried out according to the following procedure by reference to the Winkler method. 10.0 g of a sample is dispersed in 50 ml of ion-exchanged water, immersed therein for 15 min, and thereafter filtered; and the filtrate is titrated with hydrochloric acid. At this time, by using phenolphthalein and bromophenol blue as indicators, the amount of the surface LiOH and the amount of the surface $Li_2CO_3$ are calculated based on the discoloration of the filtrate and the amount of titration at this time.

In the present positive electrode active material, in order to make the amount of $Li_2CO_3$ smaller than 0.3% by weight, it is preferable that the surface treatment conditions and the heat treatment conditions are regulated to cause the unreacted content to react sufficiently. However, the regulation is not limited to these regulation methods.

<Powder Resistance>

In the present positive electrode active material, the powder resistance measured by a powder resistance measuring instrument when a load of 2 kN is applied is made to be preferably 4,500Ω or lower, more preferably 3,300Ω or lower, and still more preferably 2,500Ω or lower.

In order to make the powder resistance of the present positive electrode active material fall within the above range, it is preferable that the crushing conditions, the surface treatment conditions and the heat treatment conditions are regulated. However, the regulation is not limited to these regulation methods.

<Application>

A positive electrode mixture can be produced by mixing the present positive electrode active material, for example, with a conductive material composed of carbon black and the like, and a binder composed of a Teflon® binder and the like. At this time, as required, the present positive electrode active material and other positive electrode active materials may be combined and used.

Then, by using such a positive electrode mixture for a positive electrode, using, for example, lithium or a material capable of intercalating and deintercalating lithium, such as carbon, for a negative electrode, and using, for a nonaqueous electrolyte, a solution in which a lithium salt such as lithium hexafluorophosphate ($LiPF_6$) is dissolved in a mixed solvent of ethylene carbonate-dimethyl carbonate or the like, a lithium secondary cell can be constituted. However, cell constitutions are not limited to such a constitution.

Since lithium cells having the present positive electrode active material as at least one positive electrode active material, when being used in repeating charge and discharge, exhibit an excellent charge-discharge cycle ability (cyclability), the present lithium metal composite oxide powder is especially excellent for an application to a positive electrode active material of lithium cells used as motor driving power supplies mounted especially on electric vehicles (EVs) and hybrid electric vehicles (HEVs).

Here, the "hybrid vehicles" are vehicles which concurrently use two power sources of an electric motor and an internal combustion engine.

Further the "lithium cells" means including every cell containing lithium or lithium ions therein, such as lithium primary cells, lithium secondary cells, lithium ion secondary cells and lithium polymer cells.

<Production Method>

Examples of the production method of the present positive electrode active material include a method comprising the steps of: subjecting a particle powder (referred to as "present lithium metal composite oxide particle powder") of the lithium metal composite oxide having a layer crystal structure to a surface treatment using a surface treating agent containing at least one of aluminum, titanium and zirconium (referred to as "surface treatment step); and thereafter subjecting the present lithium metal composite oxide particle powder after the surface treatment to a heat treatment (referred to as "heat treatment step"). However, the production method is not limited to such a method.

Here, since the production method suffices if comprising the surface treatment step and the heat treatment step, the production method may further comprise other steps. For example, a crushing step may be added after the heat treatment step, and a crushing step and a classification step may be added before the surface treatment step. Further other steps may be added.

Here, there is no intention of limiting the production method of the present positive electrode active material to the method described above.

(Production Method of the Present Lithium Metal Composite Oxide Particle Powder)

The present lithium metal composite oxide particle powder can be obtained by mixing raw materials, as required, granulating and drying, thereafter calcining, as required, subjecting the resultant to a heat treatment, and further as required, crushing the resultant.

However, a lithium metal composite oxide powder procured by being purchased or otherwise is subjected to predetermined treatments and can also be used as the present lithium metal composite oxide particle powder.

Examples of the lithium compound to be used as a raw material for the present lithium metal composite oxide particle powder include lithium hydroxide (including LiOH and LiOH.H$_2$O), lithium carbonate (Li$_2$CO$_3$), lithium nitrate (LiNO$_3$), lithium oxide (Li$_2$O), and besides, fatty acid lithium and lithium halides.

The kind of the manganese compound to be used as a raw material for the present lithium metal composite oxide particle powder is not especially limited. There can be used, for example, manganese carbonate, manganese nitrate, manganese chloride, manganese dioxide, manganese (III) oxide and trimanganese tetraoxide; among these, manganese carbonate and manganese dioxide are preferable. Among these, electrolytic manganese dioxide obtained by an electrolysis method is especially preferable.

The kind of the nickel compound to be used as a raw material for the present lithium metal composite oxide particle powder is also not especially limited; there can be used, for example, nickel carbonate, nickel nitrate, nickel chloride, nickel oxyhydroxide, nickel hydroxide and nickel oxide; and among these, nickel carbonate, nickel hydroxide and nickel oxide are preferable.

The kind of the cobalt compound to be used as a raw material for the present lithium metal composite oxide particle powder is also not especially limited; there can be used, for example, basic cobalt carbonate, cobalt nitrate, cobalt chloride, cobalt oxyhydroxide, cobalt hydroxide and cobalt oxide; and among these, basic cobalt carbonate, cobalt hydroxide, cobalt oxide and cobalt oxyhydroxide are preferable.

The kind of the aluminum compound to be used as a raw material for the present lithium metal composite oxide particle powder is also not especially limited; there can be used, for example, aluminum carbonate, aluminum nitrate, aluminum chloride, aluminum oxyhydroxide, aluminum hydroxide and aluminum oxide; and among these, aluminum carbonate, aluminum hydroxide and aluminum oxide are preferable.

Additionally, hydroxide salts, carbonate salts, nitrate salts and the like of the M element in the above formula (1) can be used as raw materials for the present lithium metal composite oxide particle powder.

A mixing method of raw materials is preferably one in which a liquid medium such as water and a dispersant are added and wet mixed to thereby make a slurry. Then, in the case of employing a spray dry method described later, the obtained slurry described before is preferably crushed by a wet crusher. However, the crushing may be dry crushing.

In such mixing of the raw materials, in order to enhance the homogeneity in raw material mixing by removing coarse powder of the nickel raw material, it is preferable that in advance before the raw materials are mixed, at least the nickel compound, as required, the nickel compound and the aluminum compound are crushed and classified to regulate such that the maximum particle diameter (Dmax) of the nickel compound becomes preferably 10 µm or smaller, more preferably 5 µm or smaller, and still more preferably 4 µm or smaller.

It is preferable that after the raw materials are mixed, the mixture is granulated as required.

A granulation method may be of a wet type or a dry type as long as the raw materials are not separated and are dispersed in granulated particles, and may be an extruding granulation method, a tumbling granulation method, a fluidized granulation method, a mixing granulation method, a spray drying granulation method, a pressing granulation method, or a flake granulation method using a roll or the like.

At this time, in the case of the wet granulation, sufficient drying before the calcination is needed. A drying method at this time suffices if drying the granulated particles by a well-known drying method such as a spray heat drying method, a hot air drying method, a vacuum drying method or a freeze drying method; and among these, a spray heat drying method is preferable.

The spray heat drying method is carried out preferably by using a heat spray dryer (spray dryer) (in the present description, referred to as "spray drying method").

Here, a coprecipitated powder to be supplied to calcination may be fabricated, for example, by a so-called coprecipitation method (in the present description, referred to as "coprecipitation method"). The coprecipitation method can provide a coprecipitated powder by dissolving raw materials in a solution, and thereafter regulating conditions including pH for precipitation to thereby obtain the coprecipitated powder.

Here, in the spray dry method, it is likely that the powder strength is relatively low and voids are generated among particles. Then, in the case of employing the spray dry method, it is preferable that in a crushing step after a calcination step described later, there is employed a crushing method having a higher crushing strength than conventional crushing methods, for example, a crushing method by a coarse crusher having a rotation frequency of about 1,000 rpm.

In the calcination step in order to obtain the present lithium metal composite oxide particle powder, it is preferable that as required, temporary calcination is carried out at 500 to 870° C., and thereafter, regular calcination is carried out at 700 to 1,000° C. Carrying out the regular calcination at 700 to 1,000° C. with no temporary calcination is also allowed.

The temporary calcination can remove gases (for example, $CO_2$) generated from components contained in raw materials. Therefore, for example, in the case where carbonate salts such as lithium carbonate ($Li_2CO_3$), manganese carbonate, nickel carbonate and basic cobalt carbonate are used as raw materials, carrying out temporary calcination is preferable.

Then, when the regular calcination is carried out at a higher temperature than in the temporary calcination, the crystallinity of the particle can be raised and the particle can be regulated in a desired particle diameter.

It is preferable that the temporary calcination is carried out in a calcining furnace in an air atmosphere, an oxygen gas atmosphere, an atmosphere whose oxygen partial pressure is regulated, a carbon dioxide gas-containing atmosphere, or another atmosphere, by holding its temperature at a temperature of 500° C. to 870° C. (the temperature is that in the case where a material to be calcined in the calcining furnace is brought into contact with a thermocouple), preferably 600° C. or higher and 870° C. or lower, more preferably 650° C. or higher and 770° C. or lower, for 0.5 hours to 30 hours.

The kind of the calcining furnace is not especially limited. The calcination can be carried out, for example, by using a rotary kiln, a stationary furnace or another calcining furnace.

It is preferable that the regular calcination is carried out in a calcining furnace in an air atmosphere, an oxygen gas atmosphere, an atmosphere whose oxygen partial pressure is regulated, a carbon dioxide gas-containing atmosphere, or another atmosphere, by holding its temperature at a temperature of 700 to 1,000° C. (the temperature is that in the case where a material to be calcined in the calcining furnace is brought into contact with a thermocouple), preferably 750° C. or higher and 950° C. or lower, more preferably 800° C. or higher and 950° C. or lower, still more preferably 830° C. or higher and 910° C. or lower, for 0.5 hours to 30 hours. At this time, the calcination conditions are preferably selected such that a material to be calcined containing a plurality of metal elements can be regarded as a single phase of a lithium metal composite oxide having a target composition.

The kind of the calcining furnace is not especially limited. The calcination can be carried out, for example, by using a rotary kiln, a stationary furnace or another calcining furnace.

In the case where the regular calcination with no temporary calcination is carried out, it is preferable that the regular calcination is carried out by holding the temperature at 700 to 1,000° C., preferably 750° C. or higher and 950° C. or lower, more preferably 800° C. or higher and 950° C. or lower, still more preferably 850° C. or higher and 910° C. or lower, for 0.5 hours to 30 hours.

It is preferable that the heat treatment after the calcination in order to obtain the present lithium metal composite oxide powder is carried out, in the case where the regulation of the crystal structure is needed. With respect to the heat treatment atmosphere at this time, the heat treatment is preferably carried out under the condition of an oxidative atmosphere such as an air atmosphere, an oxygen gas atmosphere or an atmosphere whose oxygen partial pressure is regulated.

The crushing after the calcination or the heat treatment is preferably carried out by using a high-speed rotary crusher or the like. When the crushing is carried out by a high-speed rotary crusher, aggregation of particles and weakly sintered portions can be crushed, and moreover, strains can be prevented from being generated in particles. It is not, however, that crushing mean is limited to a high-speed rotary crusher.

One example of the high-speed rotary crusher includes a pin mill.

The pin mill is known as a disk rotary crusher, which is a crushing machine of such a system that rotation of a rotary disk with pins causes the interior pressure to be reduced and a powder to be sucked in from the raw material feed port. Hence, whereas microparticles are easily carried on the air stream because of their light mass, and pass through the clearance in the pin mill, coarse particles are securely crushed. Hence, crushing with use of a pin mill enables the aggregation of particles and weakly sintered portions to be securely crushed and also can prevent strains from being generated in particles.

The rotation frequency of the high-speed rotary crusher is made to be preferably 4,000 rpm or higher, more preferably 5,000 rpm or higher and 12,000 rpm or lower, and still more preferably 7,000 rpm or higher and 10,000 rpm or lower.

The classification after the regular calcination, because of having a technical significance of regulation of the particle size distribution of an aggregated powder and removal of foreign matter, is preferably carried out by selecting a sieve having a preferable sieve opening.

In the present lithium metal composite oxide particle powder thus produced, the amount of moisture measured at 110 to 300° C. by the Karl Fischer method is preferably 50 to 1,000 ppm. When the amount of moisture is 50 ppm or larger, the reaction with particularly a coupling agent among surface treating agents can be raised to enhance the surface treatment effect. On the other hand, when the amount of moisture is 1,000 ppm or smaller, it is preferable in that the cell characteristics can be made equal or higher.

From such a viewpoint, the amount of moisture of the present lithium metal composite oxide particle powder is preferably 50 to 1,000 ppm, more preferably 50 ppm or larger and 700 ppm or smaller, and still more preferably 50 ppm or larger and 500 ppm or smaller, particularly 400 ppm or smaller.

Here, the amount of moisture measured at 110 to 300° C. by the Karl Fischer method is an amount of moisture released when a measurement sample is heated for 45 min in an apparatus in a nitrogen atmosphere at 110° C., thereafter heated up to 300° C. and heated at 300° C. for 45 min by using a Karl Fischer moisture meter (for example, CA-100, manufactured by Mitsubishi Chemical Corp.).

It is considered that moisture measured at 110 to 300° C. by the Karl Fischer method is mainly moisture chemically bonded to the present lithium metal composite oxide particle powder inner portion.

Means to regulate the amount of moisture of the present lithium metal composite oxide particle powder in the above range mainly include a method in which the present lithium metal composite oxide particle powder produced as described above is dried, dehumidified or controlled in the humidity in storage. However, the means is not limited to such a method.

(Surface Treatment Step)

A method for subjecting the present lithium metal composite oxide particle powder produced as in the above can be carried out by bringing the present lithium metal composite oxide powder obtained as in the above into contact with a surface treating agent containing at least one of aluminum, titanium and zirconium.

Examples of the method of carrying out the surface treatment include a method in which a surface treating agent of an organometal compound containing at least one of aluminum, titanium and zirconium, such as a titanium coupling agent, an aluminum coupling agent, a zirconium coupling agent, a titanium-aluminum coupling agent, titanium-zirconium coupling agent, an aluminum-zirconium coupling agent or a titanium-aluminum-zirconium coupling agent, is dispersed in an organic solvent to thereby fabricate a dispersion, and the dispersion is brought into contact with the present lithium metal composite oxide particle powder obtained as in the above.

Examples of the surface treating agent include compounds having an organic functional group and a hydrolyzable group in their molecule. Among these, preferable are the compounds having phosphorus (P) on their side chains. A coupling agent having phosphorus (P) on its side chains, because of being good in affinity for a binder, is especially excellent in bindability with the binder.

In the surface treatment step, preferably about 0.1 to 20% by weight of the surface treating agent is brought into contact with 100% by weight of the lithium metal composite oxide powder; and more preferably 0.5% by weight or higher and 10% by weight or lower, still more preferably 1% by weight or higher and 5% by weight or lower, and further still more preferably 1% by weight or higher and 3% by weight or lower of the surface treating agent is brought into contact with the present lithium metal composite oxide powder.

More specifically, it is preferable that the present lithium metal composite oxide powder and the surface treating agent are brought into contact, for example, such that the proportion {(M/lithium metal composite oxide powder)×100, (M: Al, Ti, Zr)} of a total molar number of aluminum, titanium and zirconium in the surface treating agent to a molar number of the present lithium metal composite oxide powder becomes 0.005 to 4%, preferably 0.04% or higher and 2% or lower, more preferably 0.08% or higher and 1% or lower, and especially preferably 0.08% or higher and 0.6% or lower.

Further, it is preferable that the lithium metal composite oxide powder and the surface treating agent are brought into contact such that the proportion {(M/Ni)×100, (M: Al, Ti, Zr)} of a total molar number of aluminum, titanium and zirconium in the surface treating agent to a molar number of nickel in the present lithium metal composite oxide powder becomes 0.01 to 13%, preferably 0.05% or higher and 7% or lower, more preferably 0.1% or higher and 3.5% or lower, and especially preferably 0.1% or higher and 2% or lower.

When the content of Ni is high, since the life deterioration at a relatively high voltage becomes large, it is preferable that the total amount of aluminum, titanium and zirconium in the surface treating agent is regulated by a ratio thereof to the amount of Ni contained.

With respect to the amount of a dispersion in which the surface treating agent is dispersed in an organic solvent or water, it is preferable that the amount of the dispersion is regulated, with respect to 100% by weight of the present lithium metal composite oxide powder, in 0.2 to 20% by weight, preferably 1% by weight or larger and 15% by weight or smaller, more preferably 2% by weight or larger and 10% by weight or smaller, and still more preferably 2% by weight or larger and 7% by weight or smaller; and this amount of the dispersion is brought into contact with the present lithium metal composite oxide powder.

In the case of the lithium metal composite oxide having a layer crystal structure, when the amount of an organic solvent or water to be contacted is large, since lithium in the layer crystal structure dissolves out, it is preferable that the amount of the surface treating agent or the amount of the dispersion in which the surface treating agent is dispersed in the organic solvent or water is limited as described above.

Further when a small amount of the surface treating agent or the dispersion in which the surface treating agent is dispersed in the organic solvent or water is thus brought into contact with the lithium metal composite oxide powder, the surface treating agent can be brought into contact with the lithium metal composite oxide powder while being mixed with air or oxygen. It can be presumed that since oxygen can thereby be made to remain on the particle surface, it can contribute to the supply of oxygen to be consumed in the oxidative reaction of an organic substance in the later heat treatment.

At this time, it is preferable that not that the above amount of the surface treating agent or the dispersion in which the surface treating agent is dispersed in the organic solvent is at one time brought into contact and mixed with the lithium metal composite oxide powder, but the contacting and mixing treatment is divided in some times and repeated.

Additionally, a dry-type treatment utilizing an inorganic compound powder as a surface treating agent is also possible. The inorganic compound powder is preferably a metal oxide such as aluminum oxide and further, is preferably a metal hydroxide such as aluminum hydroxide.

In the case of using an inorganic compound powder, however, it is preferable that the ratio ($C_A/C_M$) of a concentration (at %) (referred to as "$C_A$"; in the case where the surface element A contains two or more elements, the total concentration) of the surface element A to a concentration (at %) (referred to as "$C_M$"; in the case where the constituent element M contains two or more elements, the total concentration) of the constituent element M as measured by XPS, the thickness of the surface portion, and the like are controlled to thereby regulate the conditions so as not to increase resistance components.

(Adhesion Treatment of the Surface Portion)

In the case where the surface treatment is carried out using a surface treating agent as described above, it is preferable that after the lithium metal composite oxide powder is heated and dried, for example, to 40 to 120° C. in order to evaporate the organic solvent or water, the lithium metal composite oxide powder is subjected to a heat treatment of a following step. Depending on the kind of the surface treating agent, the adhesion treatment is preferably carried out at 120° C. or higher and lower than 950° C. Depending on the kind of the surface treating agent, the adhesion treatment and the heat treatment step can be carried out simultaneously.

(Heat Treatment Step)

In the heat treatment step after the surface treatment step, it is preferable that the lithium metal composite oxide powder after the surface treatment is subjected to the heat treatment in an atmosphere of an oxygen concentration of 20 to 100% so as to hold a temperature of 700 to 950° C. (the temperature is that in the case where a material to be calcined in the furnace is brought into contact with a thermocouple, that is, a product temperature) for a predetermined time.

Such a heat treatment can evaporate the organic solvent or water, can decompose side chains of the surface treating agent, and can diffuse aluminum, titanium or zirconium in the surface treating agent from the surface into the deep layer direction, can suppress the reaction with an electrolyte solution and improve the charge-discharge cycle ability, and can make the rate capability and output characteristics equal to or more than that of surface-treated conventional positive electrode active materials.

Further when the heat treatment temperature is made to be a temperature of the regular calcination or lower, it is preferable because the crushing load after the heat treatment can be reduced.

From the viewpoint of more enhancing the effect of such a heat treatment, the treatment atmosphere in the heat treatment step is preferably an oxygen-containing atmosphere. The oxygen-containing atmosphere is preferably an oxygen-containing atmosphere of an oxygen concentration of 20 to 100%, more preferably 30% or higher and 100% or lower, still more preferably 50% or higher and 100% or lower, further still more preferably 60% or higher and 100% or lower, and further still more preferably 80% or higher and 100% or lower.

Further the treatment temperature in the heat treatment step is preferably 700 to 950° C. (the temperature is that in the case where a material to be calcined in the calcining furnace is brought into contact with a thermocouple), more preferably 750° C. or higher and 900° C. or lower, particularly 850° C. or lower, more particularly 800° C. or lower.

Further the treatment time in the heat treatment step is, depending on the treatment temperature, preferably 0.5 to 20 hours, more preferably 1 hour or longer and 10 hours or shorter, and still more preferably 3 hours or longer and 10 hours or shorter.

The kind of the calcining furnace is not especially limited. The calcination can be carried out, for example, by using a rotary kiln, a stationary furnace or another calcining furnace.

(Crushing)

After the above heat treatment step, the lithium metal composite oxide powder may be crushed.

At this time, it is preferable that the lithium metal composite oxide powder is crushed in such a crushing strength that the change rate of the specific surface area (SSA) before and after the crushing becomes 100 to 250%.

Since it is desirable that the crushing after the heat treatment is carried out so that fresh surfaces underneath the surface treated layer are not excessively exposed so as to hold the effect of the surface treatment, the crushing is carried out so that the change rate of the specific surface area (SSA) before and after the crushing becomes preferably 100 to 200%, particularly 175% or lower, more particularly 150% or lower, still more particularly 125% or lower.

As one preferable example of such a crushing method, there can be used a crushing apparatus (for example, a pin mill) in which crushing is carried out by pins fixed on a crushing plate rotating at a high speed in a relative direction.

In the case where the crushing is carried out in a step after the surface treatment, the crushing is carried out, so as not to shave off the surface portion, preferably at 4,000 to 7,000 rpm, particularly 6,500 rpm or lower, more particularly 6,000 rpm or lower.

After the crushing carried out as in the above, as required, classification may be carried out. The classification at this time, because of having a technical significance of the particle size distribution regulation of an aggregated powder and the removal of foreign matter, is preferably carried out by selecting a sieve having a sieve opening of a preferable size.

Explanation of Terms

In the present description, in the case of being expressed as "X to Y" (X and Y are arbitrary numbers), unless otherwise specified, the expression includes a meaning of "X or more and Y or less," and also a meaning of "preferably more than X" and "preferably less than Y."

Further in the case of being expressed as "X or more" (X is an arbitrary number" or "Y or less" (Y is an arbitrary number), the expression includes an intention to the effect of "preferably more than X" or "preferably less than Y."

EXAMPLES

Then, based on Examples and Comparative Example, the present invention will be described further. The present invention, however, is not limited to the following Examples.

Example 1

Lithium carbonate having an average particle diameter (D50) of 7 µm, electrolytic manganese dioxide having an average particle diameter (D50) of 23 µm and a specific surface area of 40 m$^2$/g, nickel hydroxide having an average particle diameter (D50) of 22 µm, cobalt oxyhydroxide having an average particle diameter (D50) of 14 µm, and aluminum hydroxide having an average particle diameter (D50) of 1.4 µm were weighed such that Li:Ni:Co:Mn:Al in molar ratio became 1.05:0.46:0.21:0.27:0.01.

A polycarboxylate ammonium salt aqueous solution (manufactured by San Nopco Ltd., SN Dispersant 5468) as a dispersant was added to ion-exchanged water. The amount of the dispersant added was made to become 6% by weight to the nickel hydroxide and the aluminum hydroxide weighed in the above.

The nickel hydroxide and the aluminum hydroxide were added in the above ion-exchanged water, and mixed and stirred to thereby prepare a slurry having a solid content concentration of 40% by weight. The slurry was wet crushed at 1,300 rpm for 60 min by using a wet crusher (SC220/70A-VB-ZZ, manufactured by Nippon Coke & Engineering Co., Ltd.) to thereby obtain a crushed slurry having an average particle diameter (D50) of 0.56 µm and a maximum particle diameter (Dmax) of 1.9 µm.

Then, the electrolytic manganese dioxide, the cobalt oxyhydroxide and the lithium carbonate weighed in the above and ion-exchanged water were added to the crushed slurry containing the nickel hydroxide and the aluminum hydroxide to thereby regulate the slurry to have a solid content concentration of 60% by weight. At this time, the dispersant was added so as to become 6% by weight based on the amount of the slurry solid content.

The slurry was wet crushed at 1,300 rpm for 50 min by using the same wet crusher as above to thereby obtain a mixed and crushed slurry having an average particle diameter (D50) of 0.45 μm and a maximum particle diameter (Dmax) of 1.6 μm.

The obtained mixed and crushed slurry was granulated and dried by using a heat spray dryer (manufactured by Ohkawara Kakohki Co., Ltd., Spray Dryer OC-16). At this time, the spraying used a twin-fluid nozzle, and the granulation and drying was carried out at a spray pressure of 0.6 MPa, at an amount of slurry to be fed of 14 kg/hr and by regulating the temperature such that the temperature of the outlet port of the drying tower became 100 to 110° C.

The obtained granulated powder was temporarily calcined in the air atmosphere at 720° C. for 5 hours, and thereafter regularly calcined in the air at 905° C. for 22 hours, by using a stationary electric furnace. The fired aggregation obtained by the calcination was put in a mortar and crushed with a pestle, and sieved with a sieve opening of 5 mm. The undersize product was crushed by a high-speed rotary crusher (pin mill, manufactured by Makino Mfg. Co., Ltd.) (crushing condition: rotation frequency: 7,000 rpm). Thereafter, the resultant was classified with a sieve having a sieve opening of 53 μm and an undersize lithium metal composite oxide powder was recovered.

In the obtained lithium metal composite oxide powder, the amount of moisture measured at 110 to 300° C. by the Karl Fischer method was 350 ppm.

As a result of a chemical analysis of the lithium metal composite oxide powder obtained by the calcination, it was $Li_{1.05}Ni_{0.46}Co_{0.21}Mn_{0.27}Al_{0.01}O_2$.

Then, with respect to the weight of the lithium metal composite oxide powder, 3.0% by weight of an aluminum coupling agent (Ajinomoto Fine-Techno Co., Inc., Plenact® AL-M) as a surface treating agent and 4.0% by weight of isopropyl alcohol as a solvent were mixed to thereby prepare a dispersion in which the aluminum coupling agent was dispersed in the solvent. Thereafter, 7.0% by weight of the dispersion was added to 100% by weight of the lithium metal composite oxide powder obtained by the calcination, and mixed by using a cutter mill (Millser 720G, manufactured by Iwatani Corp.).

Then, the mixture was vacuum dried at 80° C. for 1 hour, and thereafter dried in the air at 100° C. for 1 hour in a dryer. Thereafter, the resultant was subjected to a heat treatment in an atmosphere of an oxygen concentration of 100% so as to hold the product temperature at 780° C. for 5 hours to thereby obtain a lithium metal composite oxide powder.

The lithium metal composite oxide obtained by the heat treatment was classified with a sieve having a sieve opening of 53 μm to thereby obtain an undersize lithium metal composite oxide powder (sample).

Example 2

A lithium metal composite oxide powder (sample) was obtained as in Example 1, except for carrying out the drying after the surface treatment in the air at 100° C. for 1 hour, and altering the heat treatment temperature after the surface treatment to 900° C.

Example 3

A lithium metal composite oxide powder (sample) was obtained as in Example 1, except for altering the dispersion to be used for the surface treatment to a dispersion, in which an aluminum coupling agent was dispersed in a solvent, prepared by mixing, with respect to the weight of the lithium metal composite oxide powder, 1.0% by weight of the aluminum coupling agent (Ajinomoto Fine-Techno Co., Inc., Plenact® AL-M) as a surface treating agent and 1.3% by weight of isopropyl alcohol as the solvent, and altering the heat treatment temperature after the surface treatment to 770° C.

Example 4

A lithium metal composite oxide powder (sample) was obtained as in Example 1, except for altering the dispersion to be used for the surface treatment to a dispersion, in which an aluminum coupling agent was dispersed in a solvent, prepared by mixing, with respect to the weight of the lithium metal composite oxide powder, 1.5 parts by mass of the aluminum coupling agent (Ajinomoto Fine-Techno Co., Inc., Plenact® AL-M) as a surface treating agent and 2.0 parts by mass of isopropyl alcohol as the solvent, and altering the heat treatment temperature after the surface treatment to 770° C.

Example 5

A lithium metal composite oxide powder (sample) was obtained as in Example 4, except for altering the air atmosphere in the heat treatment after the surface treatment to an air atmosphere (an oxygen concentration of 21%).

Example 6

Lithium carbonate having an average particle diameter (D50) of 7 μm, electrolytic manganese dioxide having an average particle diameter (D50) of 23 μm and a specific surface area of 40 m²/g, nickel hydroxide having an average particle diameter (D50) of 22 μm, cobalt oxyhydroxide having an average particle diameter (D50) of 14 μm, and aluminum hydroxide having an average particle diameter (D50) of 1.4 μm were weighed such that Li:Ni:Co:Mn in molar ratio became 1.04:0.48:0.20:0.28.

A polycarboxylate ammonium salt aqueous solution (manufactured by San Nopco Ltd., SN Dispersant 5468) as a dispersant was added to ion-exchanged water. The amount of the dispersant added was made to become 6% by weight to the nickel hydroxide and the aluminum hydroxide weighed in the above.

The nickel hydroxide and the aluminum hydroxide weighed in the above were added in the above ion-exchanged water, and mixed and stirred to thereby prepare a slurry having a solid content concentration of 40% by weight. The slurry was wet crushed at 1,300 rpm for 60 min by using a wet crusher (SC220/70A-VB-ZZ, manufactured by Nippon Coke & Engineering Co., Ltd.) to thereby obtain a crushed slurry having an average particle diameter (D50) of 0.57 μm and a maximum particle diameter (Dmax) of 2.0 μm.

Then, the electrolytic manganese dioxide, the cobalt oxyhydroxide and the lithium carbonate weighed in the above and ion-exchanged water were added to the crushed slurry containing the nickel hydroxide and the aluminum hydroxide to thereby regulate the slurry to have a solid content concentration of 60% by weight. At this time, the dispersant was added so as to become 6% by weight based on the amount of the slurry solid content.

The slurry was wet crushed at 1,300 rpm for 50 min by using the same wet crusher as above to thereby obtain a mixed and crushed slurry having an average particle diameter (D50) of 0.46 μm and a maximum particle diameter (Dmax) of 1.7 μm.

The obtained mixed and crushed slurry was granulated and dried by using a heat spray dryer (manufactured by Ohkawara Kakohki Co., Ltd., Spray Dryer OC-16). At this time, the spraying used a twin-fluid nozzle, and the granulation and drying was carried out at a spray pressure of 0.6 MPa, at an amount of slurry to be fed of 14 kg/hr and by regulating the temperature such that the temperature of the outlet port of the drying tower became 100 to 110° C.

The obtained granulated powder was temporarily calcined in the air atmosphere at 700° C. for 5 hours, and thereafter regularly calcined in the air at 910° C. for 20 hours, by using a stationary electric furnace. The fired aggregation obtained by the calcination was put in a mortar and crushed with a pestle, and sieved with a sieve opening of 5 mm. The undersize product was crushed by a high-speed rotary crusher (pin mill, manufactured by Makino Mfg. Co., Ltd.) (crushing condition: rotation frequency: 7,000 rpm). Thereafter, the resultant was classified with a sieve having a sieve opening of 53 μm and an undersize lithium metal composite oxide powder was recovered.

In the obtained lithium metal composite oxide powder, the amount of moisture measured at 110 to 300° C. by the Karl Fischer method was 320 ppm.

As a result of a chemical analysis of the lithium metal composite oxide powder obtained by the calcination, it was $Li_{1.04}Ni_{0.48}Co_{0.20}Mn_{0.28}O_2$.

Then, 0.3% by weight of a dispersion as a surface treating agent, in which citric acid, polyacrylic acid, ammonia and AEROXIDE® Alu C (type number) manufactured by Evonix Industries AG were dispersed in ion-exchanged water, with respect to the lithium metal composite oxide powder was weighed, and diluted with 2.0% by weight of ion-exchanged water. Thereafter, 2.3% by weight of the diluted dispersion was added to the lithium metal composite oxide powder, and mixed by using a cutter mill (Millser 720G, manufactured by Iwatani Corp.). Thereafter, the mixture was subjected to a heat treatment in an atmosphere of an oxygen concentration of 100% so as to hold the product temperature at 770° C. for 5 hours to thereby obtain a lithium metal composite oxide powder.

The lithium metal composite oxide obtained by the heat treatment was classified with a sieve having a sieve opening of 53 μm to thereby obtain an undersize lithium metal composite oxide powder (sample).

Example 7

A lithium metal composite oxide powder (sample) was obtained as in Example 6, except for altering the surface treatment conditions to that 0.7% by weight of a dispersion as a surface treating agent, in which citric acid, polyacrylic acid, ammonia and AEROXIDE® Alu C (type number) manufactured by Evonix Industries AG were dispersed in ion-exchanged water, with respect to the lithium metal composite oxide powder was weighed, and diluted with 5.3% by weight of ion-exchanged water.

Example 8

A polycarboxylate ammonium salt aqueous solution (manufactured by San Nopco Ltd., SN Dispersant 5468) as a dispersant was added to ion-exchanged water. The dispersant was added such that the amount of the dispersant became 6% by weight based on the total amount of a Li raw material, a Ni raw material, a Co raw material, a Mn raw material and the like described later. The dispersant was fully dissolved and mixed in the ion-exchanged water.

Lithium carbonate having a D50 of 7 μm, nickel hydroxide having a D50 of 22 μm, cobalt oxyhydroxide having a D50 of 14 μm, and electrolytic manganese dioxide having a D50 of 23 μm and a specific surface area of 40 m²/g were weighed such that Li:Ni:Co:Mn in molar ratio became 1.05:0.51:0.19:0.26.

The weighed raw materials were mixed and stirred in the above ion-exchanged water containing the dispersant previously dispersed therein to thereby prepare a slurry having a solid content concentration of 50% by weight. The slurry was crushed by a wet crusher at 1,300 rpm for 40 min to thereby make the D50 to be 0.55 μm.

The obtained crushed slurry was granulated and dried by using a heat spray dryer (manufactured by Ohkawara Kakohki Co., Ltd., Spray Dryer OC-16). At this time, the spraying used a rotary disk, and the granulation and drying was carried out at a rotation frequency of 24,000 rpm, at an amount of slurry to be fed of 220 ml/min and by regulating the temperature such that the temperature of the outlet port of the drying tower became 100° C.

The obtained granulated powder was temporarily calcined by using a stationary electric furnace in the air at 730° C. Then, the obtained temporarily calcined powder was regularly calcined by using a stationary electric furnace at 900° C. for 20 hours.

The fired aggregation obtained by the regular calcination was put in a mortar and crushed with a pestle, and sieved with a sieve opening of 5 mm. The undersize product was crushed by a high-speed rotary crusher (pin mill, manufactured by Makino Mfg. Co., Ltd.) (crushed condition: rotation frequency: 10,000 rpm). Thereafter, the resultant was classified with a sieve having a sieve opening of 53 μm and an undersize lithium metal composite oxide powder was recovered.

Then, 2.0% by weight of a titanium coupling agent (Ajinomoto Fine-Techno Co., Inc., Plenact® KR 46B) as a surface treating agent and 5.0% by weight of isopropyl alcohol as a solvent were mixed to thereby prepare a dispersion in which the titanium coupling agent was dispersed in the solvent. Thereafter, 7.0% by weight of the dispersion was added to 100% by weight of the lithium metal composite oxide powder obtained by the calcination, and mixed by using a cutter mill (Millser 720G, manufactured by Iwatani Corp.).

Then, the mixture was vacuum dried at 80° C. for 1 hour, and thereafter dried in the air at 100° C. for 1 hour in a dryer. Thereafter, the resultant was subjected to a heat treatment in an atmosphere of an oxygen concentration of 100% so as to hold the product temperature at 770° C. for 5 hours to thereby obtain a lithium metal composite oxide.

The lithium metal composite oxide obtained by the heat treatment was sieved with a sieve opening of 5 mm, and the undersize product was crushed by a high-speed rotary crusher (pin mill, manufactured by Makino Mfg. Co., Ltd.) (crushing condition: rotation frequency: 4,000 rpm); thereafter, the resultant was classified with a sieve having a sieve opening of 53 μm to thereby obtain an undersize lithium metal composite oxide powder (sample).

Example 9

A lithium metal composite oxide powder (sample) was obtained as in Example 3, except for altering the dispersion to be used for the surface treatment to a dispersion, in which a zirconium coupling agent was dispersed in a solvent, prepared by mixing 2.2% by weight of the zirconium coupling agent (Kenrick Petrochemicals, Inc., Ken-React® NZ® 12) as a surface treating agent and 4.9% by weight of isopropyl alcohol as the solvent.

Example 10

A polycarboxylate ammonium salt aqueous solution (manufactured by San Nopco Ltd., SN Dispersant 5468) as a dispersant was added to ion-exchanged water. The dispersant was added such that the amount of the dispersant became 6% by weight based on the total amount of a Li raw material, a Ni raw material, a Co raw material, a Mn raw material and the like described later. The dispersant was fully dissolved and mixed in the ion-exchanged water.

Lithium carbonate having a D50 of 7 μm, nickel hydroxide having a D50 of 22 μm, cobalt oxyhydroxide having a D50 of 14 μm, and electrolytic manganese dioxide having a D50 of 23 μm and a specific surface area of 40 m$^2$/g were weighed such that Li:Ni:Co:Mn in molar ratio became 1.05:0.51:0.19:0.26.

The weighed raw materials were mixed and stirred in the above ion-exchanged water containing the dispersant previously dispersed therein to thereby prepare a slurry having a solid content concentration of 50% by weight. The slurry was crushed by a wet crusher at 1,300 rpm for 40 min to thereby make the D50 to be 0.55 μm.

The obtained crushed slurry was granulated and dried by using a heat spray dryer (manufactured by Ohkawara Kakohki Co., Ltd., Spray Dryer OC-16). At this time, the spraying used a rotary disk, and the granulation and drying was carried out at a rotation frequency of 24,000 rpm, at an amount of slurry to be fed of 220 ml/min and by regulating the temperature such that the temperature of the outlet port of the drying tower became 100° C.

The obtained granulated powder was temporarily calcined by using a stationary electric furnace in the air at 700° C. Then, the obtained temporarily calcined powder was regularly calcined by using a stationary electric furnace at 900° C. for 20 hours.

The fired aggregation obtained by the calcination was put in a mortar and crushed with a pestle, and sieved with a sieve opening of 5 mm. The undersize product was crushed by a high-speed rotary crusher (pin mill, manufactured by Makino Mfg. Co., Ltd.) (crushing condition: rotation frequency: 10,000 rpm). Thereafter, the resultant was classified with a sieve having a sieve opening of 53 μm and an undersize lithium metal composite oxide powder was recovered.

Then, the surface treatment conditions were made as follows. With 100% by weight of the lithium metal composite oxide powder obtained by the calcination, 0.25% by weight of aluminum hydroxide (Showa Denko K.K., Higilite® H-43M) as a surface treating agent was mixed by using a cutter mill (Millser 720G, manufactured by Iwatani Corp.). Thereafter, a lithium metal composite oxide obtained by a heat treatment in an atmosphere of an oxygen concentration of 100% so as to hold the product temperature at 770° C. for 5 hours, was classified with a sieve having a sieve opening of 53 μm to thereby obtain an undersize lithium metal composite oxide powder (sample).

Comparative Example 1

A polycarboxylate ammonium salt aqueous solution (manufactured by San Nopco Ltd., SN Dispersant 5468) as a dispersant was added to ion-exchanged water. The dispersant was added such that the amount of the dispersant became 6% by weight based on the total amount of a Li raw material, a Ni raw material, a Co raw material, a Mn raw material and the like described later. The dispersant was fully dissolved and mixed in the ion-exchanged water.

Lithium carbonate having a D50 of 7 μm, nickel hydroxide having a D50 of 22 μm, cobalt oxyhydroxide having a D50 of 14 μm, electrolytic manganese dioxide having a D50 of 23 μm and a specific surface area of 40 m$^2$/g, and magnesium oxide having a D50 of 3 μm were weighed such that Li:Ni:Co:Mn:Mg in molar ratio became 1.044:0.512:0.186:0.257:0.001.

The weighed raw materials were mixed and stirred in the above ion-exchanged water containing the dispersant previously dispersed therein to thereby prepare a slurry having a solid content concentration of 50% by weight. The slurry was crushed by a wet crusher at 1,300 rpm for 80 min to thereby make the D50 to be 0.45 μm.

The obtained crushed slurry was granulated and dried by using a heat spray dryer (manufactured by Ohkawara Kakohki Co., Ltd., Spray Dryer OC-16). At this time, the spraying used a twin-fluid nozzle, and the granulation and drying was carried out at spray pressure of 0.6 MPa, at an amount of slurry to be fed of 160 ml/min and by regulating the temperature such that the temperature of the outlet port of the drying tower became 110° C.

The obtained granulated powder was temporarily calcined by using a stationary electric furnace in the air at 850° C. Then, the obtained temporarily calcined powder was calcined by using a stationary electric furnace at 910° C. for 20 hours.

The fired aggregation obtained by the calcination was put in a mortar and crushed with a pestle, and classified with a sieve having a sieve opening of 53 μm, and an undersize lithium metal composite oxide powder (sample) was recovered.

As a result of a chemical analysis of the obtained lithium metal composite oxide powder (sample), it was $Li_{1.04}Ni_{0.512}Co_{0.186}Mn_{0.257}Mg_{0.001}O_2$.

Comparative Example 2

A polycarboxylate ammonium salt aqueous solution (manufactured by San Nopco Ltd., SN Dispersant 5468) as a dispersant was added to ion-exchanged water. The dispersant was added such that the amount of the dispersant became 6% by weight based on the total amount of a Li raw material, a Ni raw material, a Co raw material, a Mn raw material and the like described later. The dispersant was fully dissolved and mixed in the ion-exchanged water.

Lithium carbonate having a D50 of 7 μm, nickel hydroxide having a D50 of 22 μm, cobalt oxyhydroxide having a D50 of 14 μm, and electrolytic manganese dioxide having a D50 of 23 μm and a specific surface area of 40 m$^2$/g were weighed such that Li:Ni:Co:Mn in molar ratio became 1.05:0.51:0.19:0.26.

The weighed raw materials were mixed and stirred in the above ion-exchanged water containing the dispersant previously dispersed therein to thereby prepare a slurry having a solid content concentration of 50% by weight. The slurry was crushed by a wet crusher at 1,300 rpm for 40 min, to thereby make the D50 to be 0.55 μm.

The obtained crushed slurry was granulated and dried by using a heat spray dryer (manufactured by Ohkawara Kakohki Co., Ltd., Spray Dryer OC-16). At this time, the spraying used a rotary disk, and the granulation and drying was carried out at a rotation frequency of 24,000 rpm, at an amount of slurry to be fed of 220 ml/min and by regulating the temperature such that the temperature of the outlet port of the drying tower became 100° C.

The obtained granulated powder was temporarily calcined by using a stationary electric furnace in the air at 700° C.

Then, the obtained temporarily calcined powder was calcined by using a stationary electric furnace at 900° C. for 20 hours.

The fired aggregation obtained by the calcination was put in a mortar and crushed with a pestle, and sieved with a sieve opening of 5 mm. The undersize product was crushed by a high-speed rotary crusher (pin mill, manufactured by Makino Mfg. Co., Ltd.) (crushing condition: rotation frequency: 10,000 rpm). Thereafter, the resultant was classified with a sieve having a sieve opening of 53 μm and an undersize lithium metal composite oxide powder was recovered.

68.2% by weight of the lithium metal composite oxide powder thus obtained, and 0.8% by weight of aluminum isopropoxide as a surface treating agent were mixed and stirred for 10 min in 31.0% by weight of ethanol. The mixture was allowed to stand still for 30 min, and thereafter filtered. Thereafter, the resultant was subjected to a heat treatment in an atmosphere of an oxygen concentration of 100% so as to hold the product temperature at 770° C. for 5 hours to thereby obtain a lithium metal composite oxide powder (sample).

<Analysis of the Surface Portion>

The cross-section of the particle surface vicinity of the lithium metal composite oxide (sample) was observed by a transmission electron microscope ("JEM-ARM200F," manufactured by JEOL Ltd.), and analyzed by energy dispersive X-ray spectrometry (EDS).

As a result, it could be confirmed that in the lithium metal composite oxides (samples) obtained in the above Examples, a layer containing a large number of an Al element was present on the surface of each particle.

The thickness of the surface portion was measured by carrying out a line analysis on the particle surface portion and taking the length between both ends of the peaks of the Al element as a thickness of the surface portion.

<Analysis by XPS>

The proportions of elements present in the depth direction were analyzed under sputtering by an XPS ("XPS Quantam 2000," manufactured by Ulvac-Phi, Inc.). Here, the concentrations and the ratios of the surface elements and the constituent elements were analyzed as proportions of elements present on the outmost surface of the lithium metal composite oxide (sample).

The instrument specification, the instrument conditions and the like used in the measurement were as follows.

X-ray source: AlKα1 (1,486.8 eV)
Tube voltage: 17 kV
Tube current: 2.35 mA
X-ray irradiation area: 200 μmφ
Measurement condition: state and semi-quantitative narrow measurement
Pass energy: 23.5 eV
Measurement interval: 0.1 eV
Sputtering rate: 1 to 10 nm/min (in terms of SiO2)

The analysis of the XPS data was carried out using data analysis software ("Multipack Ver 6.1A," manufactured by Ulvac-Phi, Inc.). The orbit to be used for the calculation was determined for each element and the analysis was carried out by taking the sensitivity coefficient into consideration.

Ni: 2p3, sensitivity coefficient: 2.309
Co: 2p3, sensitivity coefficient: 2.113
Mn: 2p1, sensitivity coefficient: 0.923
Al: 2p, sensitivity coefficient: 0.256
Ti: 2p, sensitivity coefficient: 2.077
Zr: 3d, sensitivity coefficient: 2.767
C: 1s, sensitivity coefficient: 0.314
O: 1s, sensitivity coefficient: 0.733

The element ratios to be calculated by the above were checked by taking the interference of the Ni LMM peak into consideration and checking with the compositional ratios of the above-mentioned chemical analysis result.

As a result, for each lithium metal composite oxide (sample) obtained in the above Examples, it could be confirmed that the ratio ($C_A/C_M$) of a concentration (in the case where the surface element A contained two or more elements, the total concentration) of the surface element A to a concentration (in the case where the constituent element M contained two or more elements, the total concentration) of the constituent element M was higher than 0 and lower than 0.8.

<Amount of Surface LiOH and Amount of Surface $Li_2CO_3$>

Titration was carried out according to the following procedure by reference to the Winkler method. 10.0 g of a sample was dispersed in 50 ml of ion-exchanged water, immersed therein for 15 min, and thereafter filtered; and the filtrate was titrated with hydrochloric acid. At this time, by using phenolphthalein and bromophenol blue as indicators, the amount of the surface LiOH and the amount of the surface $Li_2CO_3$ were calculated based on the discoloration of the filtrate and the amount of titration at this time.

<Calculation of the Amount of Surface Lithium Impurity>

The amount of the sum of an amount of lithium hydroxide and an amount of lithium carbonate calculated from the above titration was taken as an amount of surface lithium impurity.

<Measurement of the D50>

For each lithium metal composite oxide powder (sample) obtained in the Examples and the Comparative Example, there was determined the D50 by using an automated sample feed machine ("Microtrac SDC," manufactured by Nikkiso Co., Ltd.) for a laser diffraction particle size distribution analyzer, and charging the lithium metal composite oxide powder (sample) in a water-soluble solvent, irradiating the resultant with a 40-W ultrasonic wave for 360 sec in a flow rate of 40 mL/sec; thereafter, measuring the particle size distribution by using the laser diffraction particle size distribution analyzer "MT3000II" manufactured by Nikkiso Co., Ltd., and determining D50 from a chart of a volume-based particle size distribution obtained.

Here, the water-soluble solvent in the measurement was passed through a 60-μm filter; and with the following conditions: the solvent refractive index was 1.33; the particle transparency condition was transmission; the particle refractive index was 2.46; the shape was taken as nonspherical; the measurement range was 0.133 to 704.0 μm; and the measuring time was 30 sec, and an average value of two-times measurements was used as D50.

<Measurement of the Specific Surface Area>

0.5 g of the lithium metal composite oxide powder (sample) was weighed and placed in a glass cell for a flow-type gas adsorption specific surface area analyzer MONOSORB LOOP ("product name: MS-18," manufactured by Yuasa Ionics), and was treated in the nitrogen gas atmosphere at 250° C. for 10 min, after the glass cell interior was replaced by nitrogen gas flowing at a gas volume of 30 mL/min for 5 min by using a pre-treatment apparatus for the MONOSORB LOOP. Thereafter, the sample (powder) was measured by one point method for BET by using the MONOSORB LOOP.

Here, as an adsorption gas in the measurement, a mixed gas of 30% of nitrogen and 70% of helium was used.

<X-Ray Diffraction>

The X-ray diffraction measurement for each lithium metal composite oxide obtained in the Examples and the Comparative Example was carried out; and in an obtained X-ray diffraction pattern, there was calculated the ratio (003)/(104) of an integral intensity of the peak originated from the (003) plane to an integral intensity of the peak originated from the (104) plane.

The X-ray diffraction measurement was carried out using an X-ray diffractometer (D8 ADVANCE, manufactured by Bruker AXS K.K.). The instrument specification, the instrument conditions and the like used in the measurement were as follows.

X-ray source: CuKα
Operation axis: 2θ/θ
Measurement method: continuous
Coefficient unit: cps
Starting angle: 10°
Ending angle: 120°
Detector: PSD
Detector Type: VANTEC-1
High Voltage: 5,585 V
Discr. Lower Level: 0.25 V
Discr. Window Width: 0.15 V
Grid Lower Level: 0.075 V
Grid Window Width: 0.524 V
Flood Field Correction: Disabled
Primary radius: 250 mm
Secondary radius: 250 mm
Receiving slit width: 0.1436626 mm
Divergence angle: 0.3°
Filament Length: 12 mm
Sample Length: 25 mm
Receiving Slit Length: 12 mm
Primary Sollers: 2.623°
Secondary Sollers: 2.623°
Lorentzian, 1/Cos: 0.004933548 Th <Evaluation of Cell Characteristics>

8.0 g of each lithium metal composite oxide powder (sample) obtained in the Examples and the Comparative Example and 1.0 g of an acetylene black (manufactured by Denki Kagaku Kogyo K.K.) were exactly weighed, and mixed in a mortar for 10 min. Thereafter, 8.3 g of a solution in which 12% by weight of a PVDF (manufactured by Kishida Chemical Co., Ltd.) was dissolved in NMP (N-methylpyrrolidone) was exactly weighed; and the mixture of the lithium metal composite oxide powder and the acetylene black was added thereto, and further mixed. Thereafter, 5 ml of NMP was added and fully mixed to thereby fabricate a paste. The paste was put on an aluminum foil being a current collector, and made into a coated film with an applicator whose gap was adjusted to 100 μm to 280 μm, vacuum dried at 140° C. for one day and night, thereafter subjected to roll pressing at a linear pressure of 0.3 t/cm², and punched out into 4016 mm to thereby make a positive electrode.

Right before the fabrication of a cell, the positive electrode was vacuum dried at 200° C. for 300 min or longer, adhered moisture was removed and the positive electrode was assembled in the cell. The average value of the weight of the aluminum foil of φ16 mm was in advance determined; and the weight of the positive electrode mixture was determined by subtracting the weight of the aluminum foil from the weight of the positive electrode. Further the content of a positive electrode active material was determined from the mixing proportions of the lithium metal composite oxide powder (positive electrode active material), the acetylene black and the PVDF.

The negative electrode used metallic Li of φ19 mm×0.5 mm in thickness; the electrolyte solution used one in which $LiPF_6$ as a solute was dissolved in 1 mol/L in a mixture as a solvent of EC and DMC in 3:7 in volume; and a known electrochemical cell sold under the trademark TOMCEL® used for electrochemical evaluation shown in the drawing was fabricated.

In the electrochemical cell shown in the drawing FIGURE, a positive electrode 3 formed from the positive electrode mixture described above was disposed at the center inside a lower body 1 made of stainless steel having resistance to organic electrolyte. At the upper surface of this positive electrode 3, a separator 4 made of a finely porous polypropylene resin, which was impregnated with an electrolyte liquid, was disposed, and the separator was fixed by a TEFLON (registered trademark) spacer 5. Furthermore, a negative electrode 6 formed of lithium metal was disposed below the upper surface of the separator, a spacer 7 which also functioned as a negative electrode terminal was disposed, and the assembly was covered thereon with an upper body 2 and then tightened with screws. Thus, the battery was sealed.

(Initial Activity)

The electrochemical cell prepared as described above was subjected to an initial activation using a method described in the following. The cell was charged at 25° C. in a 0.2 C constant current/constant potential mode up to 4.25 V, and thereafter discharged in a 0.2 C constant current mode down to 3.0 V. This process was repeated in two cycles. Here, a current value actually set was calculated from the content of the positive electrode active material in the positive electrode.

(High-Temperature Charge-Discharge Cycle Ability Evaluation: 55° C. High-Temperature Cyclability)

The electrochemical cell after being subjected to the initial activation as described above was subjected to a charge and discharge test using a method described in the following; and the high-temperature cyclability.

The cell was put in an environmental testing chamber whose environmental temperature at which the cell is charged and discharged was set at 55° C., and prepared so as to be able to be charged and discharged; the cell was allowed to stand still for 4 hours such that the cell temperature became the environmental temperature; thereafter, with the charge and discharge range being set at 4.25 V to 3.0 V, the first-cycle charge and discharge was carried out in which charge was carried out in a 0.2 C constant current/constant potential mode and discharge was carried out in a 0.2 C constant current mode; and thereafter, the charge and discharge cycle was carried out 30 times at 1 C.

The percentage (%) of a numerical value determined by dividing a discharge capacity of the 30th cycle by a discharge capacity of the second cycle was taken as a high-temperature cyclability value.

In Table 1, there were shown high-temperature cyclability values of the Examples and the Comparative Example as relative values with a high-temperature cyclability value of Comparative Example 1 being taken to be 100.

(High-Temperature High-Voltage Charge-Discharge Cycle Ability Evaluation: 45° C. High-Temperature Cyclability)

The electrochemical cell prepared as described above was subjected to an initial activation using a method described in the following. The cell was charged at 25° C. in a 0.2 C constant current/constant potential mode up to 4.5 V, and thereafter discharged in a 0.2 C constant current mode down to 3.0 V. This process was repeated in two cycles. Here, the current value actually set was calculated from the content of the positive electrode active material in the positive electrode.

The electrochemical cell after being subjected to the initial activation as described above was subjected to a charge and discharge test using a method described in the following; and the high-temperature charge-discharge cycle ability was evaluated.

The cell was put in an environmental testing chamber whose environmental temperature at which the cell is charged and discharged was set at 45° C.; and prepared so as to be able to be charged and discharged; the cell was allowed to stand still for 4 hours such that the cell temperature became the environmental temperature; thereafter, with the charge and discharge range being set at 4.5 V to 3.0 V, the first-cycle charge and discharge was carried out in which charge was carried out in a 0.2 C constant current/constant potential mode and discharge was carried out in a 0.2 C constant current mode; and thereafter, the charge and discharge cycle was carried out 30 times at 1 C.

The percentage (%) of a numerical value determined by dividing a discharge capacity of the 30th cycle by a discharge capacity of the second cycle was taken as a high-temperature charge-discharge cycle ability value.

In Table 1, there were shown high-temperature charge-discharge cycle ability values of the Examples and the Comparative Examples as relative values with a high-temperature charge-discharge cycle ability value of Comparative Example 1 being taken to be 100.

(Rate Capability Evaluation Test: the 5 C/0.2 C Discharge Capacity Retention Rate)

Separately, an electrochemical cell after being subjected to the initial activation was charged at 25° C. in a 0.2 C constant current mode up to 4.25 V, and after the charge, was discharged in a 5 C constant current mode down to 3 V. A discharge capacity in the 5 C constant current discharge mode down to 3 V divided by a discharge capacity in the 0.2 C discharge down to 3 V was taken as an index of the rate capability. A higher numerical value indicates that the rate capability is more improved.

(Output Characteristics Evaluation Test: Evaluation of the Resistance at 25° C.)

Separately, the electrochemical cell after being subjected to the initial activation was charged at 25° C. in a 0.2 C constant current mode up to an SOC of 50%. After the charge, the cell was discharged at a 3 C current value for 10 sec; a potential difference was determined by subtracting a potential after the discharge from a potential after the charge; a resistance value was determined by dividing the potential difference by the 3 C current value; and the resistance value was taken as an index of the resistance at 25° C. In Table 1, the resistance values were indicated as relative values (%) with a resistance value of Comparative Example 1 being taken to be 100.0%. These indications show that the lower the numerical value, the lower the resistance at 25° C., that is, the more the output characteristics are improved.

TABLE 1

| | | Example 1 | Example 2 | Example 3 | Example 4 | Example 5 | Example 6 | Example 7 | Example 8 | Example 9 | Example 10 | Comparative Example 1 | Comparative Example 2 |
|---|---|---|---|---|---|---|---|---|---|---|---|---|---|
| Element Present More in Surface Portion Than in Particle Inner Portion | | — | Al | Al | Al | Al | Al | Al | Ti | Zr | Al | None | Al |
| $C_A/C_M$ (Analysis by XPS) | | — | 0.12 | 0.04 | 0.06 | 0.08 | 0.07 | 0.14 | 0.40 | 0.02 | 0.03 | 0.10 | — | 0.09 |
| $C_A/C_{Ni}$ (Analysis by XPS) | | — | 0.22 | 0.07 | 0.12 | 0.19 | 0.16 | 0.28 | 0.80 | 0.04 | 0.06 | 0.19 | — | 0.18 |
| $C_A$ | at % | 1.4 | 0.4 | 0.7 | 1.0 | 0.9 | 1.8 | 4.0 | 0.3 | 0.4 | 1.6 | — | 1.6 |
| $C_M$ | at % | 12.0 | 11.1 | 10.9 | 11.8 | 12.9 | 12.8 | 10.0 | 13.6 | 12.9 | 15.4 | — | 17.0 |
| $C_{Ni}$ | at % | 6.4 | 5.9 | 5.8 | 5.2 | 5.6 | 6.4 | 5.0 | 7.2 | 6.3 | 8.2 | — | 9.1 |
| Amount of Surface Lithium Impurity | wt % | 0.23 | 0.20 | 0.24 | 0.21 | 0.30 | 0.26 | 0.25 | 0.30 | 0.24 | 0.29 | 0.62 | 0.43 |
| (003)/(104) Integral Intensity Ratio | — | 1.25 | 1.28 | 1.24 | 1.27 | 1.22 | 1.24 | 1.24 | 1.20 | 1.24 | 1.25 | 1.15 | 1.18 |
| Thickness of Surface Portion | nm | 21 | 56 | 10 | 13 | 12 | 37 | 41 | 13 | 10 | 23 | — | 26 |
| Specific Surface Area | m2/g | 0.5 | 0.4 | 0.5 | 0.5 | 0.5 | 0.6 | 0.7 | 0.7 | 0.5 | 0.8 | 0.5 | 0.6 |
| Amount of Surface LiOH | wt % | 0.10 | 0.11 | 0.10 | 0.10 | 0.11 | 0.10 | 0.10 | 0.07 | 0.10 | 0.08 | 0.15 | 0.12 |
| Amount of Surface Li2CO3 | wt % | 0.13 | 0.09 | 0.13 | 0.11 | 0.20 | 0.16 | 0.15 | 0.23 | 0.14 | 0.21 | 0.47 | 0.31 |
| D50 | μm | 8 | 8 | 7 | 7 | 7 | 7 | 7 | 7 | 7 | 6 | 9 | 7 |
| Charge-Discharge Cycle Ability: 4.25 V Capacity Retention Rate at 55° C. | % | 107 | 107 | 107 | 107 | 105 | 107 | 106 | 104 | 104 | 105 | 100 | 101 |
| Charge-Discharge Cycle Ability: 4.5 V Capacity Retention Rate at 45° C. | % | 104 | 104 | 102 | 103 | 102 | 107 | 105 | 103 | 102 | 102 | 100 | 101 |

TABLE 1-continued

|  |  | Example 1 | Example 2 | Example 3 | Example 4 | Example 5 | Example 6 | Example 7 | Example 8 | Example 9 | Example 10 | Comparative Example 1 | Comparative Example 2 |
|---|---|---|---|---|---|---|---|---|---|---|---|---|---|
| Rate Capability: 5 C/0.2 C Capacity Retention Rate | % | 103 | 103 | 103 | 102 | 102 | 102 | 100 | 103 | 103 | 103 | 100 | 98 |
| Output Characteristics: 25° C. Resistance Index | % | 83 | 73 | 79 | 77 | 90 | 87 | 90 | 94 | 60 | 81 | 100 | 103 |

<Measurement of the Powder Resistance Value>

The powder resistance value was measured when a pressure of 2 kN was applied as described below by using a powder resistance tester.

The measurement of the powder resistance used a powder resistivity measuring unit "MCP-PD51," manufactured by Mitsubishi Chemical Analytech Co., Ltd. 3.0 g of the lithium metal composite oxide powder (sample) was weighed, and packed in a low-resistance probe cylinder. After the low-resistance probe was set on the tester body, the pressure regulation was carried out using a probe piston and a hydraulic pump such that a load of 2 kN was applied on the powder. Then, the resistance value (Ω) of the powder was measured in the state that the load of 2 kN was being applied on the powder by using the low resistivity meter "Loresta GP (MCP-T610)."

TABLE 2

|  |  | Example 1 | Example 2 | Example 3 | Example 4 | Example 5 | Example 6 | Example 8 | Example 9 | Example 10 |
|---|---|---|---|---|---|---|---|---|---|---|
| Powder Resistance Value at 2 kN | Ω | 2181 | 2046 | 2338 | 2068 | 3279 | 3158 | 3312 | 2597 | 3558 |

(Consideration)

From the Examples and Comparative Examples and results of tests carried out by the inventor, it was found that with respect to the positive electrode active material for a lithium secondary cell, comprising an active particle having the surface portion where one or a combination of two or more of the group consisting of Al, Ti and Zr is present, on a surface of the particle comprising the lithium metal composite oxide having a layer crystal structure, when the ratio ($C_A/C_M$) of a concentration (in the case where the surface element A contains two or more elements, the total concentration) of the surface element A to a concentration (in the case where the constituent element M contains two or more elements, the total concentration) of the constituent element M is higher than 0 and lower than 0.8, as measured by XPS, the reaction with an electrolyte solution can be suppressed and the charge-discharge cycle ability can be improved, and the output characteristics and the rate capability can be made equal to or more than those of conventionally proposed surface-treated positive electrode active materials.

It was further found that when in an X-ray diffraction pattern measured by a powder X-ray diffractometer (XRD) using CuKα1 radiation, the ratio (003)/(104) of an integral intensity of the peak originated from the (003) plane to an integral intensity of the peak originated from the (104) plane is higher than 1.15, the rate capability and the output characteristics can be made good.

Although the above Examples are Examples of the lithium metal composite oxides having a layer crystal structure having a specific composition, from the results of the tests carried out by the present inventor and the technical common sense, since lithium metal composite oxides having a layer crystal structure have common problems, and the influences by the surface treatment and the heat treatment are similar, it can be considered that the lithium metal composite oxides having a layer crystal structure can attain the same common effect irrespective of their compositions.

It can be considered that since particularly a material having, as a core material, a particle comprising the lithium metal composite oxide having a layer crystal structure and represented by the general formula: $Li_{1+x}M_{1-x}O_2$ (wherein M is one or a combination of two or more (these are referred to as "constituent element M") of the group consisting of Mn, Co, Ni, transition elements of from the third group elements to the 11th group elements of the periodic table, and typical elements up to the third period of the periodic table) has the common problems and properties, the same effect can be attained.

The invention claimed is:

1. A positive electrode active material for a lithium secondary cell, comprising a particle having a surface portion where one or a combination of two or more (these are referred to as "surface element A") of the group consisting of Al, Ti and Zr is present, on a surface of a particle comprising a lithium metal composite oxide having a layer crystal structure and represented by the general formula: $Li_{1+x}M_{1-x}O_2$, wherein x=0 to 0.07 and M is one or a combination of two or more (referred to as "constituent element M") of the group consisting of Mn, Co, Ni, transition elements in the third group elements through and including the 11th group elements of the periodic table, and elements in the first period through and including the third period of the periodic table, wherein a ratio ($C_A/C_M$) of a concentration (at %) (referred to as "$C_A$"; in the case where the surface element A contains two or more elements, the total concentration) of the surface element A to a concentration (at %) (referred to as "$C_M$"; in the case where the constituent element M contains two or more elements, the total concentration) of the constituent element M is higher than 0 and lower than 0.8, as measured by X-ray photoelectron spectroscopy (XPS); an amount of surface lithium impurity is smaller than 0.40% by weight; and in an X-ray diffraction pattern measured by a powder X-ray diffractometer (XRD) using CuKα1 radiation, a ratio (003)/(104) of an integral intensity of a peak originated from the (003) plane to an integral intensity of a peak originated from the (104) plane is higher than 1.15.

2. The positive electrode active material for a lithium secondary cell according to claim 1, wherein a ratio ($C_A/C_{Ni}$) of a concentration (at %) (referred to as "$C_A$"; in the case where the surface element A contains two or more elements, the total concentration) of the surface element A to a concentration (at %) (referred to as "$C_{Ni}$") of a constituent element Ni is higher than 0 and lower than 2.0, as measured by X-ray photoelectron spectroscopy (XPS).

3. The positive electrode active material for a lithium secondary cell according to claim 2, wherein a concentration (at %) (referred to as "$C_M$"; in the case where the constituent element M contains two or more elements, the total concentration) of the constituent element M is higher than 0 at % and lower than 30 at %; a concentration (at %) (referred to as "$C_A$"; in the case where the surface element A contains two or more elements, the total concentration) of the surface element A is higher than 0 at % and lower than 10 at %; and a concentration (at %) (referred to as "$C_{Ni}$") of a constituent element Ni is higher than 0 at % and lower than 25 at %, as measured by X-ray photoelectron spectroscopy (XPS).

4. The positive electrode active material for a lithium secondary cell according to claim 2, wherein a powder resistance measured by a powder resistance measuring instrument when a pressure of 2 kN is applied is 4,500Ω or lower.

5. A lithium secondary cell, comprising a positive electrode active material for a lithium secondary cell according to claim 2, as a positive electrode active material.

6. A lithium secondary cell for a hybrid electric vehicle or an electric vehicle, comprising a positive electrode active material for a lithium secondary cell according to claim 2, as a positive electrode active material.

7. The positive electrode active material for a lithium secondary cell according to claim 1, wherein a concentration (at %) (referred to as "$C_M$"; in the case where the constituent element M contains two or more elements, the total concentration) of the constituent element M is higher than 0 at % and lower than 30 at %; a concentration (at %) (referred to as "$C_A$"; in the case where the surface element A contains two or more elements, the total concentration) of the surface element A is higher than 0 at % and lower than 10 at %; and a concentration (at %) (referred to as "$C_{Ni}$") of a constituent element Ni is higher than 0 at % and lower than 25 at %, as measured by X-ray photoelectron spectroscopy (XPS).

8. The positive electrode active material for a lithium secondary cell according to claim 7, wherein a powder resistance measured by a powder resistance measuring instrument when a pressure of 2 kN is applied is 4,500Ω or lower.

9. A lithium secondary cell, comprising a positive electrode active material for a lithium secondary cell according to claim 7, as a positive electrode active material.

10. A lithium secondary cell for a hybrid electric vehicle or an electric vehicle, comprising a positive electrode active material for a lithium secondary cell according to claim 7, as a positive electrode active material.

11. The positive electrode active material for a lithium secondary cell according to claim 1, wherein a powder resistance measured by a powder resistance measuring instrument when a pressure of 2 kN is applied is 4,500Ω or lower.

12. A lithium secondary cell, comprising a positive electrode active material for a lithium secondary cell according to claim 11, as a positive electrode active material.

13. A lithium secondary cell for a hybrid electric vehicle or an electric vehicle, comprising a positive electrode active material for a lithium secondary cell according to claim 11, as a positive electrode active material.

14. A lithium secondary cell, comprising a positive electrode active material for a lithium secondary cell according to claim 1, as a positive electrode active material.

15. A lithium secondary cell for a hybrid electric vehicle or an electric vehicle, comprising a positive electrode active material for a lithium secondary cell according to claim 1, as a positive electrode active material.

16. The positive electrode active material for a lithium secondary cell according to claim 1, wherein in the general formula $Li_{1+x}M_{1-x}O_2$, x=0.01 or more to 0.07 or less.

17. The positive electrode active material for a lithium secondary cell according to claim 1, wherein in the general formula $Li_{1+x}M_{1-x}O_2$, x=0.02 or more to 0.06 or less.

* * * * *